A. BUTTERWORTH, A. BUTTERWORTH, Jr., AND H. BUTTERWORTH.
CLUTCH.
APPLICATION FILED NOV. 13, 1919.

1,397,401. Patented Nov. 15, 1921.

Witnesses
Rsina J. Finotti
Helen W. Duvall.

Inventors
Arthur Butterworth
Arthur Butterworth, Jr.,
Harold Butterworth
By Sturtevant & Mason
Attorneys.

UNITED STATES PATENT OFFICE.

ARTHUR BUTTERWORTH, ARTHUR BUTTERWORTH, JR., AND HAROLD BUTTERWORTH, OF ROCHDALE, ENGLAND.

CLUTCH.

1,397,401.   Specification of Letters Patent.   Patented Nov. 15, 1921.

Application filed November 13, 1919. Serial No. 337,842.

*To all whom it may concern:*

Be it known that we, ARTHUR BUTTERWORTH, ARTHUR BUTTERWORTH, Junior, and HAROLD BUTTERWORTH, subjects of the King of Great Britain, residing at Rochdale, in the county of Lancaster and Kingdom of England, have invented certain new and useful Improvements in Clutches, of which the following is a specification.

The present invention relates to improvements in chucking and turning machines and the like machine tools.

In the automatic turning of a part on the machine, it is often desired that the turning process be arrested after the spindle has turned through a predetermined number of revolutions. This has usually been obtained by means of a stop or cam moving to automatically disconnect the clutch after a predetermined time.

According to the present invention the stop adapted to disengage the drive after the spindle has rotated a predetermined number of times, is mounted with lost motion about a spindle, this motion being normally taken up by a spring. By this arrangement therefore, it will be possible for the clutch to be reinserted by hand to start the machinery as the spring will cause the stop to take up a different phase position that in which it threw the clutch out of gear and in which it will consequently prevent reinsertion of the clutch.

The arrangement is more particularly described with reference to the accompanying drawings in which :—

Figure 1:
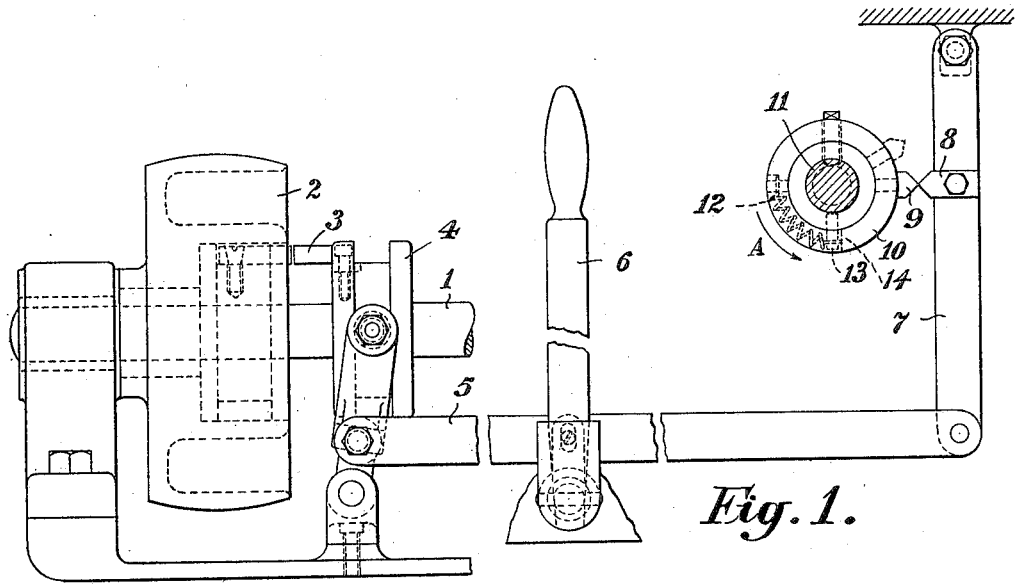
Figure 1 is a front elevation of one form of the device.
Figure 2:
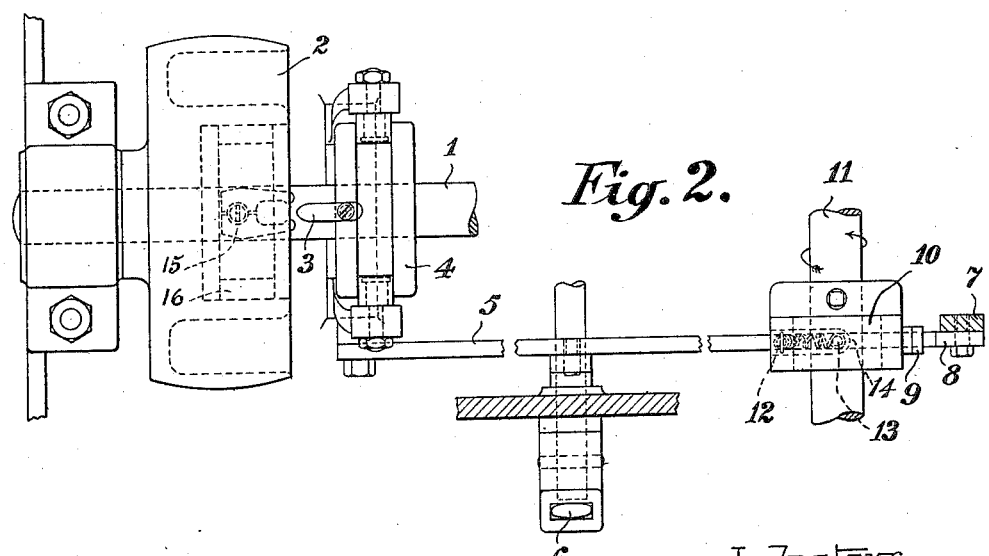
Fig. 2 is a corresponding plan view.

The shaft 1 may be any revolving driving spindle of the lathe, adapted to be coupled to the driving pulley 2 by means of a clutch pin 3, mounted on a sleeve 4 fastened on the shaft 1. This sleeve 4 is displaceable by means of a link 5 connected to an operating handle 6 connected to a pivoted link 7 having a fixed stop 8, adapted to coöperate with a moving stop 9, mounted on a sleeve 10, rotatable with a certain degree of freedom about a shaft 11. This shaft 11 is driven from the head stock spindle of the lathe at a predetermined rate, so that after a certain number of revolutions of the work the rotation of the shaft 11 causes the stop 9 to bear against the projection 8. This automatically forces the pivoted link 7 to move the link 5 to the right which in turn withdrawn the sleeve 4 and clutch pin 3 thus interrupting the drive of the work.

The sleeve 10 is connected to the shaft 11 by means of a spring 12 attached to the pin 13 of the shaft 11. When the stop 9 is forced against the projection 8 relative motion of the sleeve 10 and the shaft 11 takes place causing the spring 10 to be extended. This relative motion is limited by the edge of the slot 14 cut in the sleeve 10 to allow of the passage of the pin 13 during the relative motion, so that when the edge of the slot 14 bears against the pin 13 the said motion is stopped and the stop 9 forces the projection 8 in the required direction. The machine being then declutched from the drive, the lost motion of the sleeve 10 and the shaft 11 taken up by the spring during extension causes the stop 9 to become disengaged from the projection 8 and by further motion of the sleeve 10 to take up a position shown dotted in Fig. 1.

The apparatus is now in a position in which the drive can be reëngaged by means of the hand lever 6. When this latter is moved over to the left it moves with it the link 5 which actuates the sleeve 4 and clutch pin 3. The clutch pin 3 forces apart a pair of cam jaws 15 which expand a friction lining 16 attached to the shaft 1 causing engagement between the lining 16 and the pulley 2, thus causing the drive of the work spindle 1 and the shaft 11.

We declare that what we claim is:—

1. In a machine tool the combination of a work spindle, driving means to rotate said spindle, a clutch between said spindle and said driving means, a stop for automatically actuating said clutch after a predetermined number of revolutions of the spindle, a pivoted arm adapted to engage with said stop, a projection on said arm, means connecting said pivoted arm to said clutch, a driving shaft, a sleeve having angular motion relatively to said driving shaft and a spring connecting said sleeve to said driving shaft and limiting said angular motion.

2. In a machine tool the combination of driving means, a clutch to control said driving means, a stop for automatically operating said clutch, after a predetermined number of revolutions, a projection on a pivoted arm adapted to engage with said stop, means connecting said pivoted arm to said clutch, a clutch-operating hand lever connected to said means and adapted to allow of the reëngagement of said clutch, a driving shaft, a sleeve carrying said stop and mounted on said driving shaft, and a spring connecting said sleeve to said shaft, to limit the relative rotation thereof.

In witness whereof, we have hereunto signed our names this 15th day of September, 1919, in the presence of two subscribing witnesses.

ARTHUR BUTTERWORTH.
ARTHUR BUTTERWORTH, Junr.
HAROLD BUTTERWORTH.

Witnesses:
JOHN PRIOR,
ANNIE THOMAS.